US008214261B2

(12) United States Patent
Chen et al.

(10) Patent No.: US 8,214,261 B2
(45) Date of Patent: Jul. 3, 2012

(54) METHOD AND SYSTEM FOR PROMOTING USER GENERATION OF CONTENT

(75) Inventors: Andrew Chen, Austin, TX (US); Sam Decker, Cedar Park, TX (US); Maksim Borisovich Smolev, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 0 days.

(21) Appl. No.: 12/614,016

(22) Filed: Nov. 6, 2009

(65) Prior Publication Data
US 2010/0131384 A1    May 27, 2010

Related U.S. Application Data

(60) Provisional application No. 61/111,890, filed on Nov. 6, 2008.

(51) Int. Cl.
*G06Q 30/00*    (2006.01)
(52) U.S. Cl. ...................................................... 705/26.1
(58) Field of Classification Search .................... 705/26, 705/27, 26.1
See application file for complete search history.

(56) References Cited

U.S. PATENT DOCUMENTS

| | | | |
|---|---|---|---|
| 5,528,490 A | 6/1996 | Hill | |
| 5,761,649 A | 6/1998 | Hill | |
| 5,999,908 A | 12/1999 | Abelow | |
| 6,029,142 A | 2/2000 | Hill | |
| 6,236,994 B1 | 5/2001 | Swartz et al. | |
| 6,757,682 B1 | 6/2004 | Naimark et al. | |
| 6,785,671 B1 | 8/2004 | Bailey et al. | |
| 6,999,962 B2 | 2/2006 | Julliard et al. | |
| 7,133,834 B1 | 11/2006 | Abelow | |
| 7,143,089 B2 | 11/2006 | Petras et al. | |
| 7,222,078 B2 | 5/2007 | Abelow | |
| 7,343,294 B1 | 3/2008 | Sandholm et al. | |
| 7,409,362 B2 | 8/2008 | Calabria | |
| 7,428,496 B1 | 9/2008 | Keller et al. | |
| 7,620,565 B2 | 11/2009 | Abelow | |
| 7,620,651 B2 | 11/2009 | Chea et al. | |
| 7,908,173 B1 | 3/2011 | Hill | |
| 7,908,176 B1 | 3/2011 | Hill | |
| 7,930,363 B2 | 4/2011 | Chea et al. | |
| 7,937,391 B2 | 5/2011 | Chea et al. | |
| 8,001,003 B1 | 8/2011 | Robinson et al. | |
| 2002/0107861 A1 | 8/2002 | Clendinning et al. | |
| 2002/0112035 A1 | 8/2002 | Carey et al. | |

(Continued)

OTHER PUBLICATIONS

Prospero Unveils New Hosted Community Application for Custom-Branded Ratings and Reviews; PR Newswire. New York: Feb. 13, 2006. p. 1; http://proquest.umi.com/pqdweb?did=985933201&sid=15&Fmt=3&clientId=19649&RQT=309&VName=PQD.*

(Continued)

*Primary Examiner* — Mila Airapetian
(74) *Attorney, Agent, or Firm* — Sprinkle IP Law Group

(57) ABSTRACT

Systems and methods for promoting user generation of content are disclosed. More particularly, embodiments of systems and methods to facilitate the generation of content by users are disclosed. Specifically, in one embodiment, in order to drive generation of desired content, the generation of content by a user may be linked to an opportunity to generate additional content (where the two types of content may be the same or different). In particular, in certain embodiments when a user has generated a first type of content the opportunity to generate a second type of content may be presented to that user.

16 Claims, 9 Drawing Sheets

U.S. PATENT DOCUMENTS

| | | | |
|---|---|---|---|
| 2002/0165905 A1 | 11/2002 | Wilson | |
| 2003/0088452 A1* | 5/2003 | Kelly | 705/10 |
| 2004/0143600 A1 | 7/2004 | Musgrove et al. | |
| 2004/0230511 A1 | 11/2004 | Kannan et al. | |
| 2005/0044197 A1 | 2/2005 | Lai | |
| 2006/0069564 A1 | 3/2006 | Allison et al. | |
| 2006/0129446 A1 | 6/2006 | Ruhl et al. | |
| 2006/0143068 A1 | 6/2006 | Calabria | |
| 2006/0230064 A1 | 10/2006 | Perkowski | |
| 2006/0282326 A1 | 12/2006 | Lombardi | |
| 2007/0050234 A1 | 3/2007 | Corlett | |
| 2007/0050245 A1 | 3/2007 | Humphries et al. | |
| 2007/0078833 A1 | 4/2007 | Chea et al. | |
| 2007/0112760 A1 | 5/2007 | Chea et al. | |
| 2007/0150537 A1 | 6/2007 | Graham | |
| 2007/0169096 A1 | 7/2007 | Chea et al. | |
| 2007/0174247 A1 | 7/2007 | Xu et al. | |
| 2007/0192155 A1 | 8/2007 | Gauger | |
| 2007/0244888 A1 | 10/2007 | Chea et al. | |
| 2007/0266023 A1 | 11/2007 | McAllister et al. | |
| 2008/0004942 A1 | 1/2008 | Calabria | |
| 2008/0005103 A1 | 1/2008 | Ratcliffe et al. | |
| 2008/0097835 A1* | 4/2008 | Weiser | 705/14 |
| 2008/0140577 A1 | 6/2008 | Rahman et al. | |
| 2008/0189274 A1 | 8/2008 | Mann | |
| 2008/0201643 A1 | 8/2008 | Nagaitis et al. | |
| 2008/0222003 A1 | 9/2008 | Adstedt et al. | |
| 2008/0244431 A1 | 10/2008 | Chea et al. | |
| 2008/0301055 A1 | 12/2008 | Borgs et al. | |
| 2009/0037412 A1 | 2/2009 | Bard et al. | |
| 2009/0276233 A1* | 11/2009 | Brimhall et al. | 705/1 |
| 2010/0114883 A1 | 5/2010 | Chea et al. | |
| 2010/0205549 A1 | 8/2010 | Chen et al. | |
| 2010/0205550 A1 | 8/2010 | Chen et al. | |
| 2011/0093393 A1* | 4/2011 | Chang et al. | 705/50 |

OTHER PUBLICATIONS

International Search Report and Written Opinion for PCT Application No. PCT/US2009/063560, completed Dec. 12, 2009, mailed Dec. 31, 2009, 7 pgs.

Hoegg, R. et al., "Overview of Business Models for Web 2.0 communities", GeNeMe 2006, Dresden, Germany, Oct. 2006, [retrieved Dec. 12, 2008 from URL: www.alexandria.unisg.ch/EXPORT/DL/Katharina__Stanoevska/31412.pdf], 17 pgs.

Qui, G. et al. "Incorporate the Syntactic Knowledge in Opinion Mining in User-Generated Content" Zhejiang University, Apr. 22, 2008, [retrieved Dec. 12, 2008 from URL: http://www.ct.cs.titech.ac.jp/-fujii/NLPIX2008/slide4.pdf], 26 pgs.

"User Generated Content, Research Brief", produced by Resource Interactive and BazaarVoice, Feb. 2008, [retrieved Dec. 12, 2008 from URL: http://resource.com/rj/assets/pdf/UCG__Report__BazaarVoice__RI.pdf], 7 pgs.

International Search Report and Written Opinion for International Patent Application No. PCT/US2010/000288, mailed Mar. 31, 2010, 8 pgs.

BazaarVoice, "Sephora.com Launches "Ratings & Reviews," Bringing Even More Information Than Ever to Beauty Seekers," San Francisco, CA, Sep. 4, 2008 [retrieved Mar. 18, 2010 from URL: http://bazaarvoice.com/press-room/us-press-room/268-pressreleasephpid67], 2 pgs.

Office Action for U.S. Appl. No. 12/243,679, mailed Nov. 30, 2010, 14 pgs.

www.Bazaarvoice.com—Overview (http://web.archive.org/web/20070408141819/bazaarvoice.com/overview.html).

www.Bazaarvoice.com—Solution (http://web.archive.org/web/20070409104639/bazaarvoice.com/solution.html).

www.Bazaarvoice.com—Syndicate Voice (http://web.archive.org/web/20070202125252/bazaarvoice.com/SyndicateVoice.html).

Office Action for U.S. Appl. No. 12/243,679, mailed Aug. 3, 2011, 16 pgs.

"You're It," a blog on tagging at http://www.tagsonomy.com/, printed Dec. 12, 2007, 13 pgs.

Arrington, Michael "Profile: DinnerBuzz," Jun. 2005, 4 pgs., at http:///www.techcrunch.com/2005/07/03/profile-dinnerbuzz/, printed on Dec. 12, 2007.

AdamNation tagging blog posted on Jul. 28, 2005 at http://adam.easyjournal.com/entry.aspx?eid=2632426 printed on Dec. 12, 2007, 5 pgs.

PeerPressure >> Scrumptious blog, dated Mar. 22, 2005, at http://www.allpeers.com/blog/?page__id=71, printed Dec. 12, 2007, 19 pgs.

Golder, Scott A. and Huberman, Bernardo A., "The Structure of Collaborative Tagging Systems," Information Dynamics Lab, HP Labs, Aug. 18, 2005, 8 pgs.

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academicommons.org/commons/essagy/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs, In WWW2006: Proceedings of the Collaborative Web Tagging Workshop, 2006.

Office Action for U.S. Appl. No. 12/243,679, mailed Dec. 27, 2011, 15 pgs.

Office Action for U.S. Appl. No. 12/698,510, mailed Apr. 2, 2012, 26 pgs.

European Search Report for European Patent Application No. 09825479.0, mailed Mar. 27, 2012, 5 pgs.

\* cited by examiner

Customer Q&A Exchange

| Q&A Home | Browse Q&A | Search Q&A |

[ Search all questions for this product ] [ Search ]

⊟ All (8 Questions : 10 Answers)   Sort by:  No. of Answers   Recent As   Recent Qs ▼ ⌐ does it fold up for nice and easy storage ⌐                               1 answer
1 month, 2 weeks ago
By nikkix3 🗗 (read all my Q&A)

[ ANSWER THIS QUESTION ] ~810                              0 👍  0 👎  🚩

Answers
A: No, it does fold a little so it is easier to move but it does not fold up for storage. One downfall, but I still think it was worth it.
1 month, 2 weeks ago
By ARockMom - Byron, MN 🗗(read all my Q&A)            0 👍  0 👎  🚩

▸ How big is the jumper?                                                       1 answer
▸ what age and at what weight can baby go into the rainforest jumperoo?        1 answer
▸ I just bought this used in excellent condition but didnt get any paperwork.  1 answer
  I need to know how to adjust the height.
▸ whats the maximum weight?                                                    1 answer

[ ASK A NEW QUESTION ]   See Guidelines                              1 2 next >>

Customer Q&A Exchange

Answer This Question
does it fold up for nice and easy storage
By nikkx3 - *1 month, 2 weeks ago*

Your Answer

You can take it apart, but it does take some work. Not terrible, but not super easy. However, it was worth the money. My daughter loved this thing when she was 11 to 18 months. She's 2 years old now (walking very well) and still wants to jump in it every now and then.

See Guidelines

Add Images to Your Answer

Select Image

[　　　　　] [Browse] [Upload]

(2 image max, 5mb max per image)

Upload Photos With your Question or Answer (optional)

To upload a photo from your computer, click Browse. You may upload up to 2 photos.

Photo tips:
- Photos must be related to product or topic where they will appear
- Use your photos to show a specific product feature or issue that could help others
- Please do not post obscene, nude or offensive photos
- Before uploading your photos, read the Q&A Exchange Guidelines and our Terms and Conditions Inappropriate material will be rejected Add a Video to Your Answer Video URL

[　　　　　]

(optional)
(Paste the URL from your videos on YouTube)

Video Caption

[　　　　　　　　　　]

(optional)
Example: "Watch the assembly process." 150 Characters Max.

Your Nickname * mistergadget

Location

Austin, TX　　　　(optional)

Questions & Answers are typically posted within 24 hours, pending approval.

[PREVIEW ▶]　[CANCEL]

Upload a Video With Your Question or Answer (optional)

To share a video, paste the videos URL from Google Video or YouTube. You may share one video per post.

Video tips:
- The video must be related to product or topic where it will appear
- Ask about a specific product feature or demonstrate something about a product that could help others
- Video must be currently uploaded to Google Video or YouTube
- If you are not the copyright holder, you may not submit copyrighted videos
- Please do not point to obscene, nude, or offensive videos
- Before uploading your video, read the Q&A Exchange Guidelines and our Terms and Conditions. Inappropriate material will be rejected

— # METHOD AND SYSTEM FOR PROMOTING USER GENERATION OF CONTENT

RELATED APPLICATIONS

This application claims a benefit of priority under 35 U.S.C. §119 to U.S. Provisional Patent Application No. 61/111,890 entitled "Method and System for Promoting User Generation of Content" by Andrew Chen and Sam Decker filed Nov. 6, 2008.

TECHNICAL FIELD

This invention relates generally to user generated content. More particularly, embodiments of this invention relate to the generation of this user generated content. Even more specifically, certain embodiments of this invention relate to promoting user generation of content.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially recommendations, but also general information. In the context of advertising and marketing, the use of word of mouth may mean passing information between consumers or other entities, including manufacturers, experts, retailers, etc. to convey aspects or merits of a product or service, or the experience one person has related to that product or service, or related products or services.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouth marketing.

This view has been widely reinforced by many retailers (retailers will be used herein to refer to any type of seller of a product or service, for example both online and brick and mortar) who report that products with relatively more reviews sell better and are returned less often. Thus, user generated content (comprising any information such as text, audio, video, or other information carrying medium generated by a user who is a consumer (of goods, a product, website, service, purchaser of the product, etc.)) may be extremely important to manufacturers, retailers or other sellers of a product or service (collectively referred to herein as a product) as user generated content may allow products to be differentiated and sales of products increased.

As this user generated content may include such things as user reviews, user stories, ratings, comments, problems, issues, question/answers, or other type of content which, for example, a user is allowed to compose or submit through any medium, there may be many methods and locations (for example, online or offline) where a user may be allowed to generate content and the user content generated may be provided in a wide variety of mediums or formats the distribution of this user generated content may be difficult. In fact, in many cases user generated content may be more effectively generated or gathered at one location and more effectively utilized at a different location. Thus, the effective collection and distribution of user generated content may be important to both manufacturers and retailers of products, as utilization of such user generated content may increase sales of these products.

As such, in many cases, retailers or manufacturers may provide customers the ability to produce such user generated content. These retailers or manufacturers may, however, produce or sell a wide variety of products. As a consequence it may be difficult to build up a critical mass of user generated content (enough to effect purchasing or other consumer decisions) with respect to any particular one product.

Every day, consumers are faced with frustrating barriers to purchasing. They get close to making a purchase decision, but are hindered by critical questions they need answered to feel like they are making an informed and confident purchase. Unfortunately, with the velocity of today's consumer marketplace, product marketing, product documentation, customer support, and channel marketing frequently fall short of consumer needs and expectations. A July 2008 study by Retail Systems Research underscores the insufficiency—52% of respondents cited that the number one challenge facing retailers today is keeping product information and availability up to date. The cost of not keeping product information up to date is diminished customer loyalty and trust, increased call center volume, missed opportunity for conversion, and, ultimately, long-term damage to the brand.

To remedy this deficiency, to encourage users to generate content, retailers and manufacturers may conduct marketing campaigns or may encourage user generation of content through direct emails. While these methodologies may result in the generation of content they may have a high degree of overhead and do not result in sustained generation of user content. Additionally, these methods may only be suited to encouraging the generation of particular types of content.

As the presence of this user generated content may drive sales, it is therefore desired to actively promote the generation of such content.

SUMMARY

Users may generate and submit content using one or more content generation tools incorporated in a site. User generated content may be received at a content distribution system and user generated content associated with a particular product or category may then be distributed to one or more retailers who sell this product such that this content may be incorporated into the retailer's site in association with that product.

Consumers can find a wider variety of reviews and content at their favorite retailer site, enabling them to research and buy in one place. As a result, consumers may not have to rely on a salesperson at a store to provide information. They can read about tests conducted by expert reviewers, get product specifics from the manufacturer, ask experts or product owners questions, and get reviews and real-world experiences from consumers like them.

Thus, user generated content helps increase the overall attention and content a product or category of products can get online and offline. Accordingly, it may be desirable to promote the generation of such content by users. A key aspect in promoting the generation of this content is identifying users who may be likely to generate content and similarly users which may be responsive to requests to generate such content. Another key aspect is identifying specific types of users (for example, experts, retailers, manufacturers, product owners, etc.) so answers may be obtained from specific, or desired, types of users.

Systems and methods for promoting user generation of content are disclosed. More particularly, embodiments of systems and methods to facilitate the generation of content by users are disclosed. Specifically, in one embodiment, in order to drive generation of desired content, the generation of content by a user may be linked to an opportunity to generate additional content (where the two types of content may be the same or different). In particular, in certain embodiments when a user has generated a first type of content the opportunity to generate a second type of content may be presented to that user This opportunity may comprise a request to a user to generate a type of content associated with a particular category or product, where the type of content and category or product may be selected based on a variety of criteria, including the user, the type of content originally generated by the user, the product associated with content originally generated by a user, the category of product associated with the content originally generated by a user, some other factor altogether or some combination of factors. For example, a user who has generated a review on a particular product, after completing the review may be presented with an opportunity to answer one or more "open" questions (i.e. questions which may still have the ability to have an answer provided, regardless of whether one or more answers to the question have already been provided) corresponding to the product, category or brand associated with the product. Similarly, a user who has just answered a question about a particular product, brand, category of product, etc. may, after completing the answer, be presented with an opportunity to answer one or more "open" questions corresponding to the product, brand, category, etc.

Aspects and embodiments of the invention may provide the advantage of educating users that there is value in engaging with the community of other users, in turn reducing the effort needed to generate content for use on a site and boosting participation. Additionally, embodiments of the present invention allow users who have experience with products or brand (e.g. experts, owners, users of a product, etc.) to be easily identified and the ability to generate content surfaced to users most likely to actually generate such content.

Thus, the presentation of content generation opportunities top such users may be quite effective. In fact studies have shown that around 3.5% of users who generate a review for a product may also answer a question and around 27% of those who answer a question may answer a second question. Accordingly, embodiments of the systems and methods disclosed herein have increased the daily volume of user generation of certain types of content by as much as 139% and that, in some case, around 22% of user generated content on a web site may be driven by these types of content generation opportunities.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 7-11 are depictions of embodiments of interfaces which may be utilized by embodiments of the systems and methods disclosed herein.

DETAILED DESCRIPTION

Figure 1:
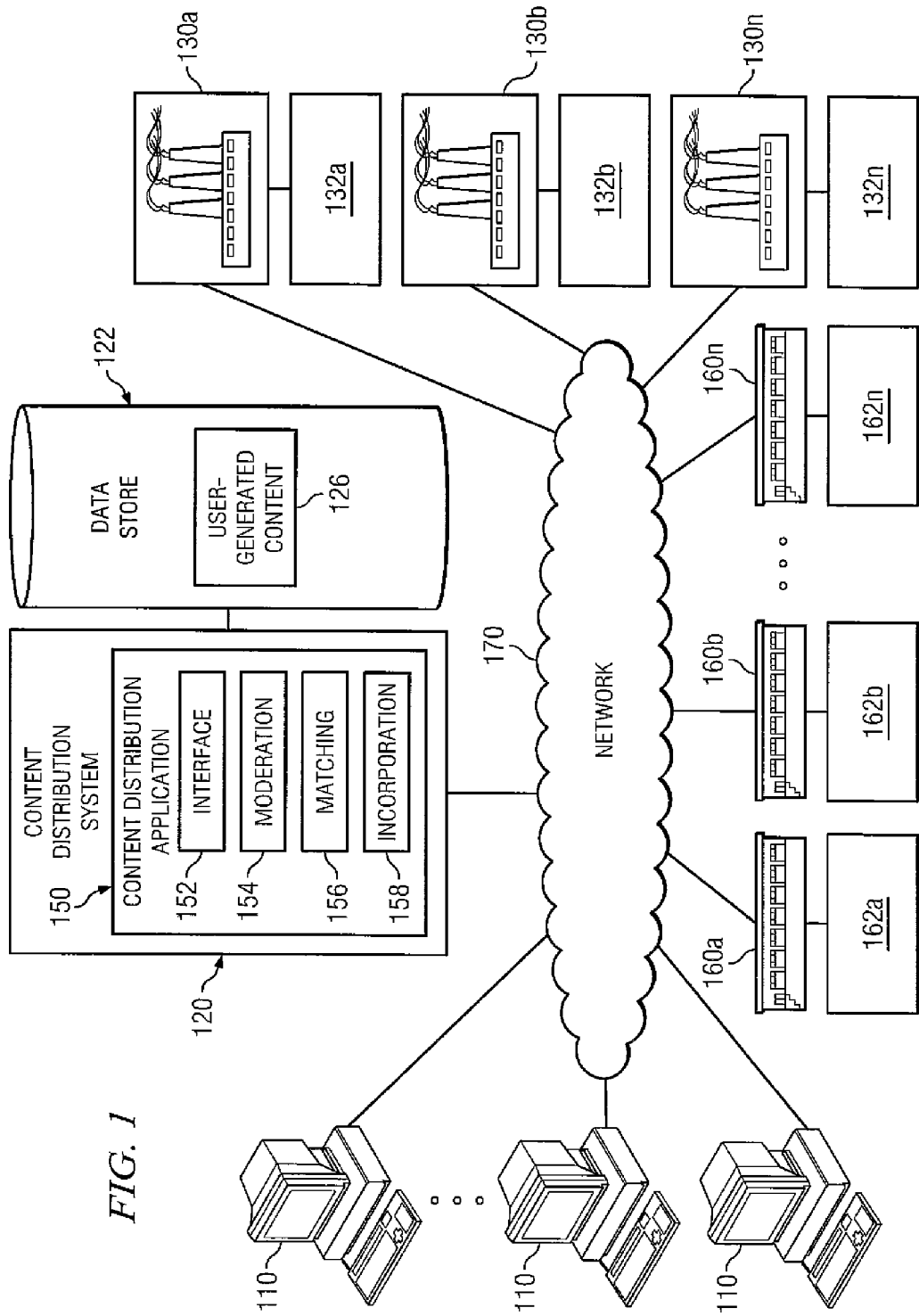
FIG. 1 is a block diagram of one embodiment of an architecture in which a content distribution system may be utilized.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises", "comprising", "includes", "including", "has", "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief overview of the context of the disclosure may be helpful. As mentioned above it is possible, in many cases, for a user to generate content with respect to a product, brand, category, manufacturer, etc. at the retailer's site, the manufacturer's site or another site altogether. As the presence of this user generated content may drive sales, it is therefore desired to actively promote the generation of such content. This is particularly true with respect to certain types of content which it has proved relatively difficult to obtain.

One example of these types of content is what is referred to as question/answer content. This type of content may actually be generated by two (possibly distinct) users, a first user who generates a question to which he wishes to obtain the answer and one or more second users who generate an answer to this question. The question and the corresponding answers may be displayed to users which may help to drive increased sales of a product or increased traffic at a retailers or manufacturer's site.

In many cases, however, for a variety of reasons users may not be highly motivated to generate a certain type of content. In other words, there may be a participation problem. For example, users may want answers to questions, but do not themselves want to generate answers to other questions. This can lead to undesirable situations where it may be apparent to a user at a site that content is lacking.

In the question/answer context, for example, it may be the case that many users have submitted questions but, because "open" questions (i.e. questions which may still have the ability to have an answer provided, regardless of whether one or more answers to the question have already been provided) may be hard to locate, dispersed throughout a site, require very specialized knowledge, etc. very few users have created answers to those questions. Thus, a user may be dissuaded from purchasing a particular product, category of products, or brand because the lack of such content.

What is desired then, is to drive or motivate users to generate content. A key aspect in promoting the generation of this content is identifying users who may be likely to generate content and similarly users which may be responsive to requests to generate such content. Another key aspect is identifying specific types of users (for example, experts, retailers, manufacturers, product owners, etc.) so answers may be obtained from specific, or desired, types of users.

One way to identify users who may both be willing to generate content and have familiarity with products, brands, categories, etc. is to utilize the correlation between users who generate content about a product and the likely product knowledge and willingness to generate content of such users (as proven by the fact that they have, or are currently, generating some form of content).

To that end, attention is now directed to systems and methods to facilitate the generation of content by users. Specifically, in one embodiment, in order to drive generation of desired content, the generation of content by a user may be linked to an opportunity to generate additional content (where the two types of content may be the same or different). In particular, in certain embodiments when a user has generated a first type of content the opportunity to generate a second type of content may be presented to that user.

This opportunity may comprise a request to a user to generate a type of content associated with a particular category or product, where the type of content and category or product may be selected based on a variety of criteria, including the user, the type of content originally generated by the user, the product associated with content originally generated by a user, the category of product associated with the content originally generated by a user, some other factor altogether or some combination of factors. For example, a user who has generated a review on a particular product, after completing the review may be presented with an opportunity to answer one or more "open" questions corresponding to the product, category or brand associated with the product. Similarly, a user who has just answered a question about a particular product, brand, category of product, etc. may, after completing the answer, be presented with an opportunity to answer one or more "open" questions corresponding to the product, brand, category, etc.

Before delving in more detail into embodiments of the present invention it may be useful to discuss embodiments of systems and methods for distributing user generated content. Certain of these embodiments may be better understood with reference to U.S. patent application Ser. No. 12/243,679, which is incorporated here by reference. Specifically, embodiments of the present invention may allow content to be generated by a user at a manufacturer's or retailer's (or other) site with respect to an associated product or category. This content may then be distributed to one or more retailers who sell that product such that the user generated content may be incorporated into the retailer's site in conjunction with that product to allow consumers shopping at that retailer to access or view such user generated content.

More particularly, in one embodiment, users may generate and submit content on a manufacturer's or retailer's site using one or more content generation tools incorporated in the retailer's or manufacturer's site. This user generated content may be received at a content distribution system and vetted using a moderation process by which undesired user generated content may be filtered out before the undesired user generated content is incorporated into a retailer's site. User generated content associated with a particular product or category may then be distributed to one or more retailers who sell this product or category of product such that this content may be incorporated into the retailer's site in association with that product or category.

Retailers may be provided with an interface to monitor aspects of this process, including the generation of content at their site by users or the incorporation of user generated content created at a manufacturer's site. This interface may, for example, allow a retailer to run a report by categories of products for sale, brands, user generated content (for example, user generated content accepted or rejected for publishing), etc.

Turning now to FIG. 1, one embodiment of a content distribution topology including one embodiment of a content distribution system is depicted. Manufacturers 130 may produce, wholesale, distribute or otherwise be affiliated with the manufacturer or distribution of one or more products. Retailers 160 may be sales outlets for products made by one or more of manufacturers 130. In fact, in most cases each retailer 160 will sell products from multiple manufacturers 130. These products may be provided for sale in conjunction with one or more websites (referred to as sites) 162 provided by each of retailers 160 such that users at computing devices 110 may access the retailer's site 162 over network 170 (for example, the Internet) in order to purchase these products or perform other actions.

In addition to offering the ability to purchase these products, retailer's site 162 may offer the ability for a user to access user generated content associated with the products offered for sale on the retailer's site 162. By accessing such user generated content at the retailer's site 162 a user may be better able to make a purchasing decision with respect to the various products offered for sale on that retailer's site 162 or may be more inclined to buy a product, as the user feels that the product has received positive user generated content (reviews, ratings, questions/answers, etc.) from a critical mass of other users, etc. A user may thus purchase a manufacturer's product from a retailer 160 using retailer's site 162.

Retailer site 162 may also offer the ability for a user to generate content with respect to products offered for sale by retailer 160 or categories of products offered for sale. In other words, a user may utilize the retailer's site 162 to generate user reviews, ratings, comments, problems, issues, question/answers, or almost any other type of content regarding a product or experience with the product, category, brand, manufacturer or retailer, where this user generated content may be displayed to users accessing retailer's site 162.

It will be apparent, however, that there may be many other ways to purchase or obtain such a product. The product may be offered for sale at many physical stores which may or may not have an online presence (for example, a site), at other retailer's sites 162, the product may be purchased second hand, received as a gift, etc. At some point then the person who obtained this product may desire to provide some sort of feedback on this product and for a variety of reasons, such a purchaser may not have access to, or may not desire to utilize, retailer's site 162 to generate content in association with the obtained product.

To allow these types of people, among other types, to provide user generated content with respect to a particular product, manufacturers 130 may provide manufacturer's sites 132 where these sites, or other means of collecting information from the user, can provide the ability for a user to generate content with respect to the manufacturer's products. In other words, a user may use the manufacturer's site 132 or these other means, to generate user reviews, ratings, comments, problems, issues, question/answers, or almost any other type of content regarding a product, category, brand, manufacturer, etc. usually regardless of where the user purchased the manufacturer's product.

In one embodiment, the user generated content which may be generated at a retailer's site 162 or manufacturer's site 132 may include reviews, stories, ask/answer content or any other type of content in any format which the user wishes to add regarding a product, brand or service (collectively referred to as a product herein), or category of products. Reviews may correspond to a user evaluation of a product and include ratings of product (for example, a number of stars), pros and cons of the product, a descriptive title and a description of a user's experience with a product, attributes of the user generating the review (for example, demographic information), other product which compliment or may be used with the product being reviewed, or any other type of evaluation of a product or aspects of a user's experience with the product. Ask/Answer content may comprise questions or answers submitted by a user, retailer or manufacturer concerning a potential purchase decision, for example regarding the capabilities or use of a product or category of products, demographic information on a user generating a question or answer. Stories may be user generated content which may pertain to open ended experiences with one or more products or categories of products which may be more tangentially related to the product than, for example, reviews.

As the amount of user generated content associated with a product or category at a retailer's site 162 may greatly affect the sale of a product (both at that site 162 and off-line purchases as well), it may be desirable to both manufacturers 130 of a product and retailers 160 who sell that product that any user generated content created in association with a product or category be displayed in conjunction with that product or category on a retailer's site 162 (which may increase revenue for both a retailer 160 and a manufacturer 130 of the product).

Content distribution system 120 may therefore be coupled to network 170 and serve to distribute content generated at both retailer's site 132 and manufacturer's site 162 to retailers' sites 162 which offers these products or categories of products for sale such that the content generated by a user with respect to that product or category at the retailer's site 162 and the manufacturer's site 132 is incorporated into that retailer's sites 162 where the product or category of product is offered. Thus, content distribution system 120 allows content generated at a particular retailer's site 162 to be combined with content generated at the manufacturer's site 132 and incorporated into that retailer's site 162 in conjunction with that product. By centralizing the distribution and incorporation of such user generated content a number of technical advantages may be achieved, especially with regards to the processing and storage of such user generated content, including the moderation of such user generated content and the formatting of such user generated content for incorporation in the sites 162 of retailers 160. Furthermore, such a centralized distribution system may have a number of business advantages. For example, as the sale of their products is important to retailer's 160 and manufacturers 130, both manufacturers 130 and retailers 160 may pay operators of content distribution system 120 for formatting or distributing the user generated content to the retailer's sites 162.

Content distribution system 120 will now be discussed in more detail. Content distribution system 120 may include one or more computers communicatively coupled to a network and a data store 122. Data store 122 may comprise user generated content 126, which may be associated with one or more products or categories, where this user generated content may have been generated at manufacturer's site 132, retailer's site 162 or another location altogether.

Content distribution system 120 may also include a content distribution application 150 which comprises an interface 152, a moderation module 154, a matching module 156 and an incorporation module 158. The interface 152 may be one or more web pages or other type of GUI (which may accessed over network 170) allowing a user such as a marketing director affiliated with a manufacturer 130 or retailer 160 to monitor or affect the distribution of user generated content, including observing the generation of content at their site by users or the incorporation of user generated content created at a manufacturer's site 132 or retailer's site 162. This interface 152, may for example, allow a retailer to run a report by categories of products for sale, brands, user generated content (for example, accepted or rejected user generated content), etc.

Moderation module 154 may moderate (for example, filter or otherwise select) content which is, or is not to be, excluded or included. Matching module 156 may serve to match user generated content received from a manufacturer 130 associated with a particular product with the same product on a retailer site 162.

Incorporation module 158 may be configured to incorporate both a tool for the generation of content into a retailer's or manufacturer's site and also to incorporate such user generated content into a retailer's site 162 for display to a user. In particular, a user may generate content regarding a product or category at manufacture's site 132 or retailer's site 162 using a content generation tool (for example, a GUI, webpage, widget, etc.) presented on the site. This tool may be implemented or developed by operators of content distribution system 120 and provided for use with a site to facilitate the generation of content by user's, or the subsequent processing, distribution and incorporation of such content by content distribution system 120. These tools may be hosted by incorporation module 158 of content distribution system 120. Thus, for example, on a page of retailer's site 162 a content generation tool may be included, such that the tool hosted at content distribution system 120 may be incorporated in the site 162 for use by a user at the site 162.

Such content generation tools can be distributed throughout a retailer's or manufacturer's site. For example, these content generation tools may be included all on a site's product catalog pages as well as the category pages which help to organize the product catalog page. Thus, such a content generation module may be advantageous by allowing content to be generated questions in the context of the product catalog page or category page on which on which it was deployed. So a module that is deployed on a television product page will receive questions and answers that may be different than questions and answers received on a module deployed on a product page for a wool sweater.

In any event, the content generated by the user with respect to a product or category may be received by content distribution system 120 and stored in association with that product or category. The received content may be moderated by moderation module 154, to determine if such content should be utilized for display on a site, or may be edited for suitability. This content can then be associated with one or more products or categories of products offered for sale by retailer 160 or the manufacturer 130, by, in one embodiment, associating the user generated content with a product identifier for a product or a category identifier and storing the content in data store 122.

A user shopping at, for example, retailer's site 162 may access a web page or other portion of the site 162 corresponding to a particular product or category. User generated content 126 associated with that product or category may be displayed such that a user viewing a portion of the retailer's site associated with a particular product or category may have user generated content 126 associated with that product or category displayed to him. The display of this user generated content to the user while he is shopping, may, in turn, motivate the user to make a purchase through retailer's site 162.

In many cases, both the content generation tool and the incorporation of user generated content may be provided in conjunction with one another on the retailer's site 162. Specifically, in one embodiment, the content from content distribution system 120 and a content generation tool may be incorporated into a portion of a web page of retailer's site 162 using an iframe or div tag (or another type of HTML element or tag, or another type of mechanism). This mechanism works in conjunction with a software module associated with content distribution system 120 (such as JavaScript or other set of computer readable instructions) included on the web page or at the retailer's site 162. The software module may make calls back to the incorporation module 158 on content distribution system 120 to incorporate the desired content for that page along with a content generation tool.

More particularly, in one embodiment, when a web page is loaded at retailer's site 162 the HTML for the page may load, followed by a loading of the iframe (which may be hidden), div, table, or other mechanism which is used to incorporate content from the content provider system 120. The software module provided by the content distribution system 120 may also load at this time to access incorporation module 158 to obtain data (e.g. reviews, stories, etc., as discussed above) for inclusion in the web page in conjunction with the mechanism (div, HTML or other element) for display of the provided content.

In one embodiment, the software module associated with content provider system 120 resident on retailer's site 162 (for example, JavaScript or other computer instructions) may be executed when the web page is loaded. This program receives content from the incorporation module 158 and copies the content into the element on the web page configured to display the content. Moreover, the ability to generate additional content may be offered, where the type of content generation opportunity offered may correspond to the type of incorporated content. For example, the opportunity to generate an additional review may be presented along with reviews that have been incorporated in the web page at the retailer's site.

It will be noted at this point that while embodiments discussed herein may be described with respect to the generation of content at one or more retailer's or manufacture's sites, the integration of the user generated content into the retailer's site and the presentation of content generation of opportunities at a retailer's site; it should be understood that other embodiments may be utilized with equal efficacy to both integrate user generated content and present content generation opportunities at almost any site desired, whether the site be a retailer's site, a manufacturer's site, a site provided by operators of a content distribution system or another site altogether. As such, embodiments may allow the generation of content at a first site, the incorporation of content at a second site and the presentation of content generation opportunities at a third site, where the first, second and third sites may each be distinct from, or the same as, one or more of the other sites.

Figure 2:
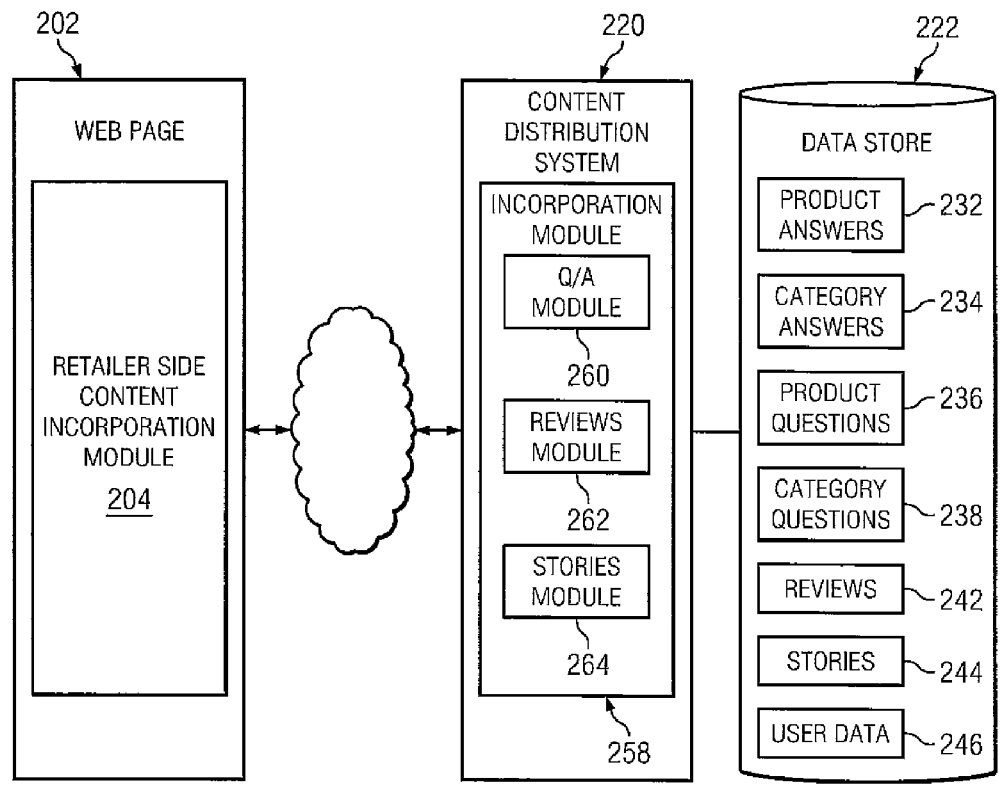
FIG. 2 is a block diagram of an architecture including a content distribution system.

Moving now to FIG. 2, an embodiment of one such architecture which may be utilized for the incorporation of user generated content into a web page of the retailer is depicted. Incorporation module 258 at content distribution system 220 may have one or more content generation modules configured to generate specific types of content for incorporation in a retailer's web site including, a question/answer module 260, a reviews module 262, a stories module 264 or any other modules which are desired. Each of these modules 260, 262, 264 may utilize associated data stored in data store 222 to determine which content to provide in response to a request such that appropriate content may be generated in response to a request. Additionally, included in the generated content may be a content generation tool configured to allow a user to generate the type of content associated with the module (or another type of content). For example, question/answer module 260 may generate question and answer content and a content generation tool to allow a user to generate questions or answers to one or more questions. This content may be incorporated into a web page to allow a user to view such questions and associated provided answers, to generate new questions or to answer open questions. Any content generated by a user may be communicated back to the module (in this example, question and answer module 260) which may then store the user generated data in data store 222.

Specifically, data store 222 may comprise product answers 232 including a set of answers, each answer associated with the user who generated the answer, the associated question, a site on which the answer was generated and a product associated with the question; category answers 234 including a set of answers, each answer associated with the user who generated the answer, the associated question, a site on which the answer was generated and a product or category associated with the question; product questions 236 including a set of open questions, each open question associated with a user who generated the question, a site on which the answer was generated and a product to which the question pertains; category questions 238 including a set of open questions, each open question associated with a user who generated the question, a site on which the answer was generated and a product or category to which the question pertains; reviews 242 which may be a review of an associated product generated by an associated user at an associated site; stories 244 including a story about one or more associated products or categories generated by an associated user on an associated site; and user data 246 which may comprise information on user's who have generated content with respect to a retailer. It will be noted that these types of data, content, groupings, associations, etc. are provided by way of example only, and that other types of data, content, groupings of content, associations, etc. may be utilized in conjunction with other embodiments.

A web page 202 at a retailer's site associated with a product or category may include a retailer side content incorporation module 204. This retailer side content incorporation module 204 may be a program which when executed in conjunction with the loading of the web page 202, retrieves content from one or more of the modules 260, 262 264 and incorporates the content into a corresponding portion on the web page 202 configured to display the content. In particular, retailer side content incorporation module 204 may, when the web page 202 is loaded by a user, issue one more calls to a content generation module 260, 262, 264 of incorporation module 258 at a content distribution system 220. A call to a content generation module 260, 262, 264 may include a reference to a product or category associated with the web page 202 such as a product or category identifier. In response to a call from the content incorporation module 204, the called module 260, 262, 264 may generate content corresponding to the product or category identified in the call (including the ability to generate more content of the same, or a different, type) and return this content to the content incorporation module 204 which issued the call. Additionally, in some embodiments, a user identifier may be included in the call to the content generation module 260, 262, 264 such that the user identification may be utilized in the generation of content by the called module (for example, to exclude content which may have been generated by that user or to include content of particular interest to that user, etc.) The content incorporation module 204 may then incorporate the received content into an appropriate portion of the web page 202.

For example, suppose a user views a web page 202 associated with a particular product. Retailer side content incorporation module 204 may, when the web page 202 is loaded by a user's browser, issue a call to question/answer module 260 referencing the particular product. In response, question/answer module 260 may utilize the identified product, product answers 232, category answers 234, product questions 236, category questions 238, user data 246, etc. to generate question/answer content and return this content to the retailer side content incorporation module 204. The retailer side content incorporation module 204 may then incorporate the received question/answer content into a portion of the web page 202 configured to display such question/answer content.

As it may be desired to incorporate different types of content into various different types of web pages, it should be noted here that various embodiments of a retailer side content incorporation module may call different content generation modules based on what type of web page incorporates the retailer side content distribution module and that additionally, the data included in the call, (for example, a product identifier, category identifier, user identifier, etc.) may likewise differ based on the type of web page, the content generation module called, or a number of other criteria.

In many cases, however, for a variety of reasons users may not be highly motivated to generate content, despite the fact that content generation opportunities are presented to them on a web page being viewed. It may be desired then, to drive or motivate users to generate content. One way to identify users who may both be willing to generate content and have familiarity with products, brands, categories, etc. is to utilize the correlation between users who do generate content about that product and the likely product knowledge and willingness to generate content of such users (as proven by the fact that they have, or are currently, generating some form of content). Thus, in order to drive generation of desired content, after the user generates content, the opportunity to generate additional content may be presented, where the content originally generated by the user and the content generation opportunity may correspond to the same, or different, types of content.

Figure 3:
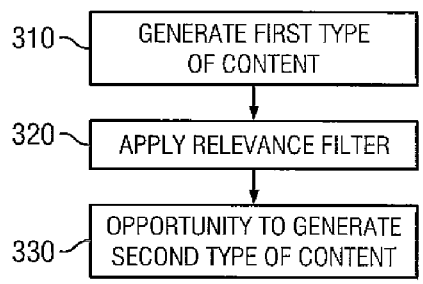
FIG. 3 is a flow diagram of one embodiment of a method for promoting user generation of content.

FIG. 3 depicts an embodiment of one method of promoting the generation of content by a user. At step 310 the user chooses to generate a first type of content, such as a review, an answer, a story, etc. about a product. At step 320 a relevance filter can then be applied to determine relevant data for the content generation opportunity. This filter may be based on a product associated with the first generated content, a brand associated with the first generated content, a category associated with the first generated content, a type of content needed, etc. The opportunity to generate content associated with the determined relevant data may then be presented, at step 330, to the user during or after the generation of the first type of content.

To illustrate with a specific example, suppose a user is generating a review of an iPod Touch™. A relevance filter may determine that there are twelve "open" questions pertaining to the iPod Touch™, ten "open questions" associated with the category "mp3 player" or "electronics" and select one or more of these questions. An opportunity to generate an answer to the selected question(s) may then be presented to the user after he has completed his review.

Figure 4:
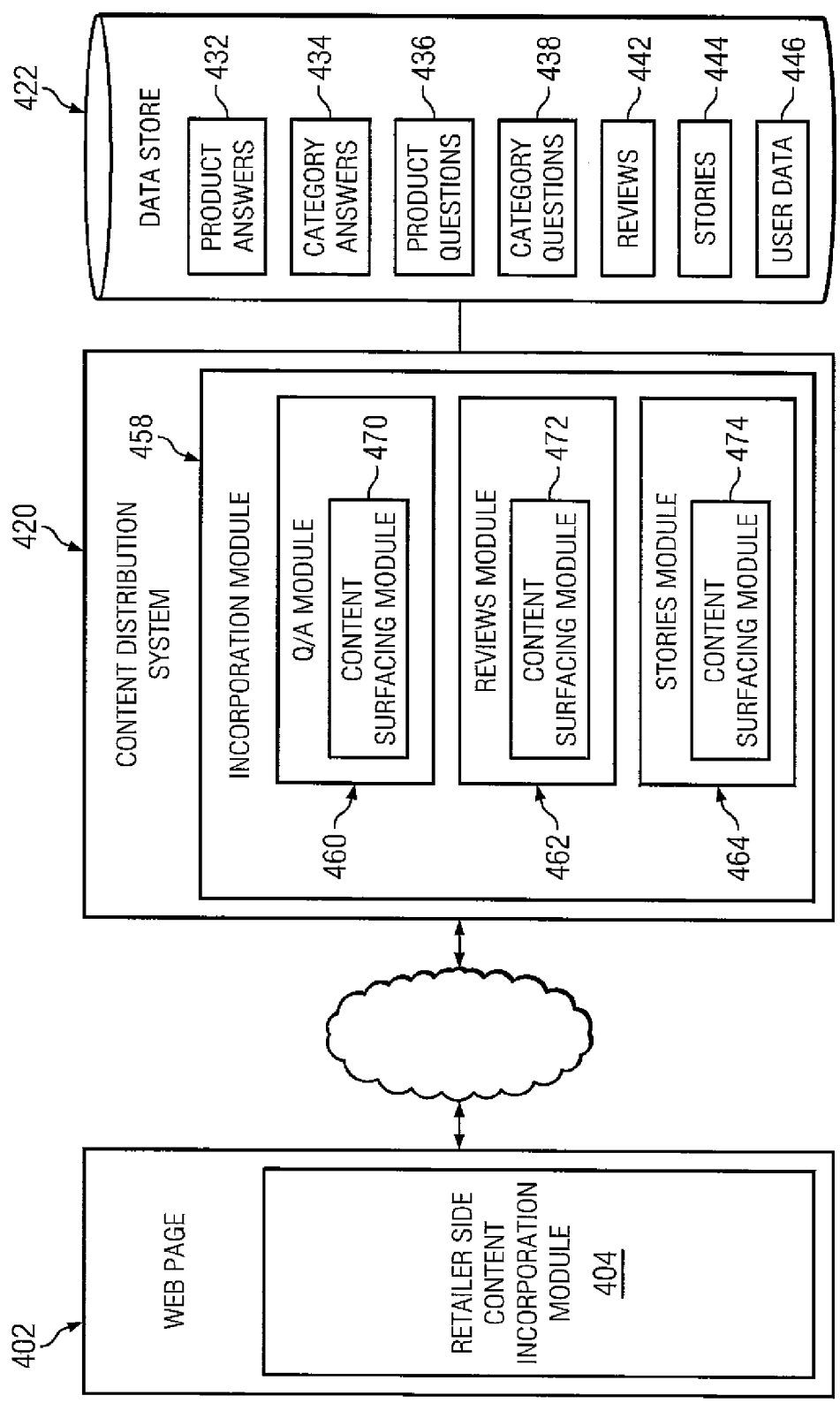
FIG. 4 is a block diagram of an architecture including a content distribution system.

FIG. 4 depicts an embodiment of an architecture similar to that depicted in FIG. 2 which may be utilized for intelligently surfacing the ability to generate content to a user based on content previously generated by user. As many components of the architecture depicted in FIG. 4 are substantially similar to the components discussed above with respect to FIG. 2 they will not be elaborated on further with respect to FIG. 4.

As discussed, then, incorporation module 458 at content distribution system 420 may have one or more content generation modules including, a question/answer module 460, a reviews module 462, a stories module 464 or any other content generation modules which are desired. Each of these modules may utilize associated data stored in data store 422 to determine which content to provide in response to a request such that the content may be generated in response to a request. Any content generated by a user may be communicated back to the content generation module which may then store the user generated data in data store 422.

Additionally, each content generation module 460, 462, 464 may include a respective content surfacing module 470, 472, 474 which is configured to generate the opportunity for a user to generate additional content, where this additional content may be the same, or a different, type than the content which was previously received from the user. It will be noted that since content surfacing modules 470, 472, 474 may function in a similar manner, it may be the case that content surfacing modules 470, 472, 474 may all be the same module or that one or more content surfacing modules 470, 472, 474 may be a call to another content surfacing module 470, 472, 474.

Accordingly, when content is generated by a user and communicated back to the respective content generation module 460, 462, 464 the respective content surfacing module 470, 472, 474 associated with that content generation module 460, 462, 464 may generate a content generation opportunity for the user. This content generation opportunity may present the user with the ability to generate additional content which may be of the same, or a different, type than the content previously generated by the user. Specifically, in one embodiment a product or category, such as a product or category identifier, or a user identifier, may be associated with content generated by a user. This data, along with the type of content originally generated by the user may be utilized by the content surfacing module 470, 472, 474 to determine the content generation opportunity with which a user should be presented, including, for example, the type of content which the content generation opportunity may offer the user the ability to generate, a product or category to be associated with the content generation opportunity, open questions to be associated with the content generation opportunity presented to a user, or other desired data. The content generation opportunity may then be presented to the user at the web site where the user initially generated content (for example, the retailer's web site).

Accordingly, as discussed above, a web page 402 at a retailer's site associated with a product or category may include a retailer side content incorporation module 404. This retailer side content incorporation module 404 may be a program which when executed in conjunction with the loading of the web page 402, obtains content from one or more of the content generation modules 460, 462, 464 and incorporates the content into a corresponding portion on the web page 402 configured to display the content. In particular, retailer side content incorporation module 404 may, when the web page 402 is loaded by a user, issue one more calls to a content generation module 460, 462, 464 of incorporation module 458 at a content distribution system 420. A call to a content generation module 460, 462, 464 may include a reference to a product or category associated with the web page 402 such as a product or category identifier. In response to a call from the content incorporation module 404, the called content generation module 460, 462, 464 may generate content of the desired type (including the ability to generate additional content) corresponding to the product or category identified in the call and return this content to the content incorporation module 404 which issued the call.

For example, suppose a user views a web page 402 associated with a particular product. Retailer side content incorporation module 404 may, when the web page 402 is loaded by a user's browser, issue a call to question/answer module 460 referencing the particular product. In response, question/answer module 460 may utilize the identified product, product answers 432, category answers 434, product questions 436, category questions 438, user data 446, etc. to generate question/answer content and return this content to the retailer side content incorporation module 404 along with the ability to generate additional question/answer content, which may include, for example, the ability to ask new questions about the product or category or answer open questions about the product or category. The retailer side content incorporation module 404 may then incorporate the received question/answer content into a portion of the web page 402 configured to display such question/answer content.

A user viewing this generated content may desire to utilize the ability to generate additional content. A user may then interact with the content generated by the content generation module 460, 462, 464 and presented in the web page 402 to generate additional content. This additional content generated by the user may be communicated from the retailer's web site to the content generation module 460, 462, 464 which generated the content originally presented to the user in the web page 402, along with a product or category identifier, a site identifier corresponding the retailer's web site, a user identifier, etc., and may be stored in data store 422.

When the newly generated user content is received by the content generation module 460, 462, 464, the respective content surfacing module 470, 472, 474 of the content generation module 460, 462, 464 may generate a content generation opportunity to present to the user based on the type of the additional generated content received from the user. The content generation opportunity may then be communicated to the retailer's web site and presented to the user. This content generation opportunity, may for example, be presented in the web page 402; another separate web page, which may for example be a "Thank You" page thanking a user for his previously generated content; a pop-up window; or in another desired manner.

Returning to the question/answer example, suppose the question/answer module 460 has generated question/answer content and return this content to the retailer side content incorporation module 404 along with the ability to generate additional question/answer content. The retailer side content incorporation module 404 has incorporated the received question/answer content into a portion of the web page 402 configured to display such question/answer content.

Using this presented question/answer content, a user may generate additional question/answer content. For example, by answering a presented question or posing a new question. This user generated content is then communicated to the question/answer module 460 at the content distribution system 420 where it is stored in data stored 422. Additionally, question/answer content surfacing module 470 may generate a content generation opportunity corresponding to this received user generated content. Specifically, based on the type of received user generated content, one or more identifiers associated with the received user generated content (for example, a user, product or category identifier) a type of content may be determined, along with one or more categories or products and any other desired relevant data. A content generation opportunity associated with that relevant data, including type of content, product, category, etc., may be generated and sent to the retailer's web site for presentation to the user.

Figure 5:
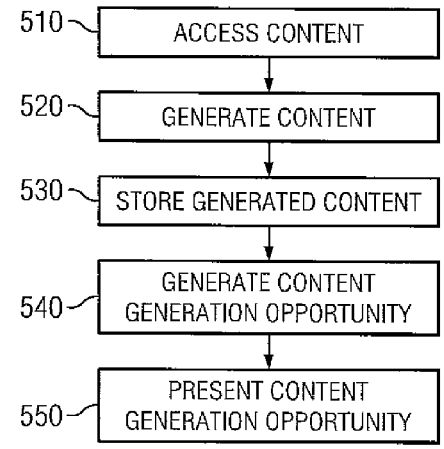
FIG. 5 is a flow diagram of one embodiment of a method for generating a content generation opportunity.

FIG. 5 depicts one embodiment of a method for the generation of a content generation opportunity. At step 510 a user may access a web page at a web site which utilizes a content distribution system such as that discussed above. As a result of this access then, a user is presented with user generated content in the web page, where in conjunction with this user generated content a user may be presented with the opportunity to generate additional content. For example, when a user views a web page corresponding to a product a user may be presented a set of reviews associated with the product and an opportunity to review a product when a user views a web page associated with the product, or a set of questions and answers associated with product along with ability to generate a new question or answer a presented question. In another example, when a user views a web page corresponding to a category a user may presented with a set of stories corresponding to the category or a set of questions and answers associated with product along with ability to generate a new question or answer a presented questions.

At step 520, then, a user may utilize the presented content generation ability to generate additional content. In some cases, this additional content may be of the same type as the content originally presented to the user. For example, when a user views a web page corresponding to a product a user may be presented a set of reviews associated with the product and an opportunity to review a product when a user views a web page associated with the product, in this case a user may generate a review of the product. Similarly, when a user views a web page corresponding to a category a user may presented with a set of questions and answers associated with product along with ability to generate a new question or answer a presented question. In this case, a user may generate a new question about the category or generate an answer to a presented question about the category.

In one embodiment, when a user desires to generate additional content the user is presented with a login screen such that certain data associated with the user may be obtained, such as what products or categories the user has previously purchased, rated or reviewed, content previously generated by the user, or other data. This login process may be accomplished by, for example, redirecting the user to a login page corresponding to an account at a retailer's web site. The retailer's web site can then provide a content distribution system with an identifier corresponding to the user, such that the user and associated data (which may be stored at the retailer's web site, the content distribution system or another location altogether) may be obtained. The user can then be directed to a web page which allows a user to generate the desired content.

In any event, once the user has generated content, the content may be sent to the content distribution system at step 530, where it is stored. At step 540 then, a content generation opportunity may be generated for the user. This content generation opportunity may occur on what will be referred to as a "thank you" pages. "Thank You" pages may serve as a confirmation to the user that their initially generated content was submitted successfully to the content distribution system. If a user accepts a content generation opportunity on the "thank you" page, they may continue to be presented with additional opportunities to contribute content until they retire from the content contribution cycle.

More specifically, in one embodiment, a type of content may be selected for the content generation opportunity. Choosing the content generation opportunity to present to the user and what order to show them may be configurable and may be configured based upon the volume of content generated in conjunction with a particular type of content generation opportunity. For example, the difference between the average daily answer volume 30 days prior to a particular configuration may be compared against the average volume in past 30 days to determine the efficacy of a particular configuration.

Figure 6:
FIG. 6 is a depiction of one embodiment of a template which may be used to present content generation opportunities.

In particular, in one embodiment, a "thank you" page may have a set of slots, where each slot may be configured to accept a content generation opportunity. FIG. 6 depicts one embodiment of a layout for a "thank you" page comprising a set of slots. A content surfacing module may employ an algorithm to select a content generation opportunity to present in each of the slots.

For example, where the user initially generates content by submitting content using a content generation tool presented on a product page or category page the algorithm functions as follows:

Step 1: First determine which questions to exclude. Questions for which the user has previously submitted answers will not be exposed.

Step 2: Next, in order of most recent to oldest, select the two most recent unanswered questions corresponding to the product corresponding to the product page on which the user initially generated content (or for the category if the user generated content at a category page) and create content generation opportunity corresponding to these questions for slots 1 and 2 respectively.

Step 3: Select the next most recently submitted unanswered category question, for the category corresponding to the product or category page on which content was initially generated by the user. Create a content generation opportunity corresponding to this question for slots 3.

Step 4: For the next available slot, create a content generation opportunity corresponding to a randomized set of all unanswered questions.

Step 5: In order of most recent to oldest, select the two most recently answered questions corresponding to the product page on which the user initially generated content (or for the category if the user generated content at a category page) and create a content generation opportunity corresponding to these question for the next two slots. This is intended to build additional answer variety for questions that already have answers.

Step 6: Create a content generation opportunity asking the user to generate a review for the product corresponding to the product page on which the user initially generated content Step 7: Create a content generation opportunity asking the user to generate a review for a different product for which they have contributed another type of content in the past (answer, testimonial/story, review, etc.).

Step 8: Create a content generation opportunity asking the user to generate a testimonial/story on this product if they have not already.

Step 9: Create a content generation opportunity asking the user to generate a testimonial/story on a different product for which they have contributed another type of content in the past (answer, testimonial/story, review, etc.).

For any step from step 2 through step 9, if the content generation opportunity for that step cannot be generated because no available content meets the criteria defined by the step, a content generation opportunity is that meets the next step's criteria may be generated.

It will be noted that a wide variety of other algorithms or methods may be used to create content generation opportunities in a particular context including type of initial content generated by the user, the product, category, content previously generated by the user, or a wide variety of other criteria. For example, in addition to increasing the number of slots available for presenting content generation opportunities, the algorithm can be configured so that steps 2 and 6 show more than two questions or the algorithm could be configured so that step 3 can show more than just one category question. Additionally, any of the steps in the algorithm can be disabled so that a content generation opportunity is not generated. Other configurations will of course be possible in other embodiments.

Once the content generation opportunity is generated, it may be presented to the user at the web site at which the user originally generated content at step 550. In one embodiment, as discussed above, generated content generation opportunities may then be presented to the user in the corresponding slots in the "thank you" page presented to the user in response to the user's initial generation of content where such a "Thank You" page may be generated to thank a user for generating the previously generated content. At that point, if desired, the user may generate additional content utilizing the content generation opportunity presented. It will be noted that if the user chooses to generate additional content utilizing the presented content generation opportunity, additional content generation opportunities may be generated and presented to the user until such a point where the user no longer desires to create additional content.

Figure 7:
Figure 10:
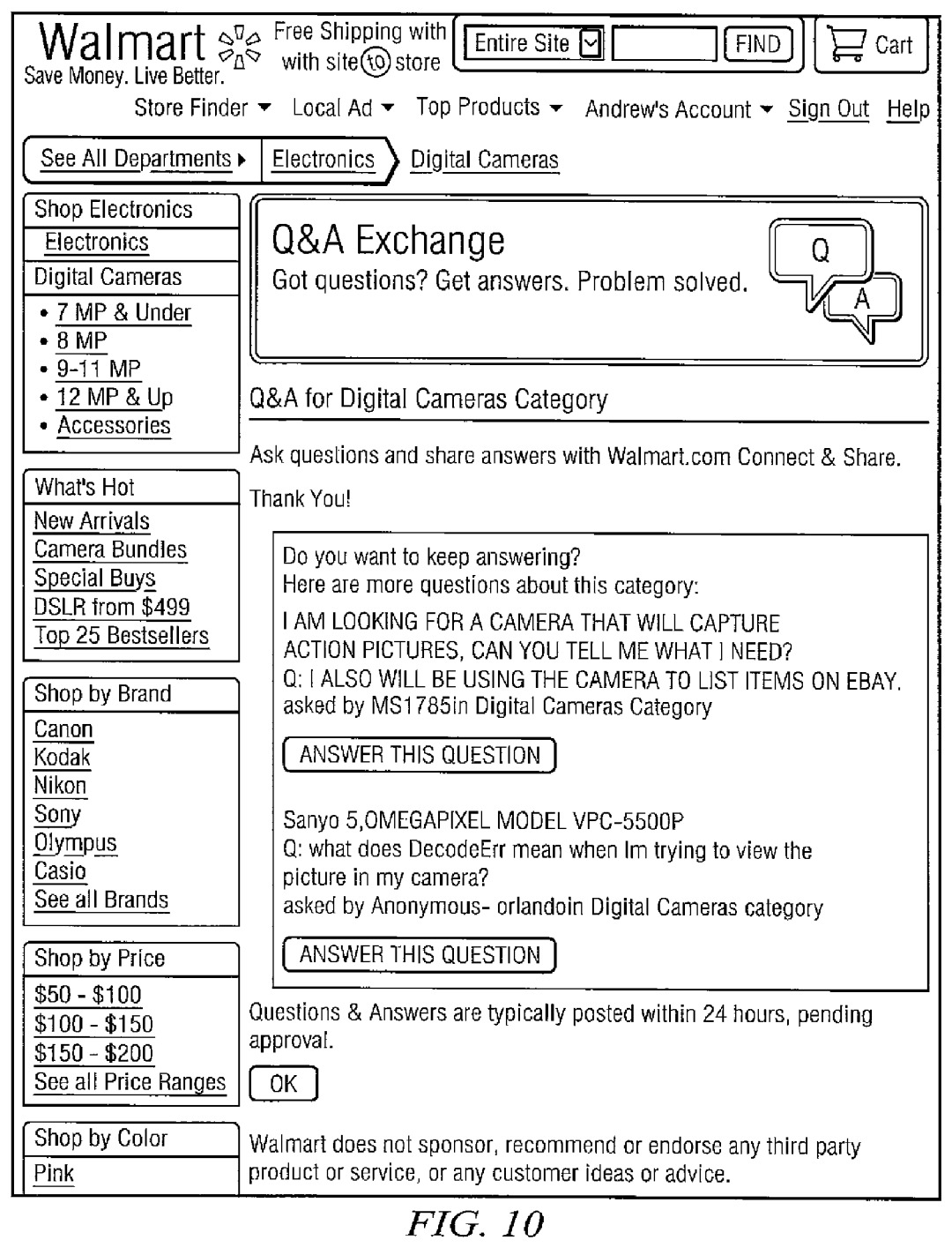
Figure 11:
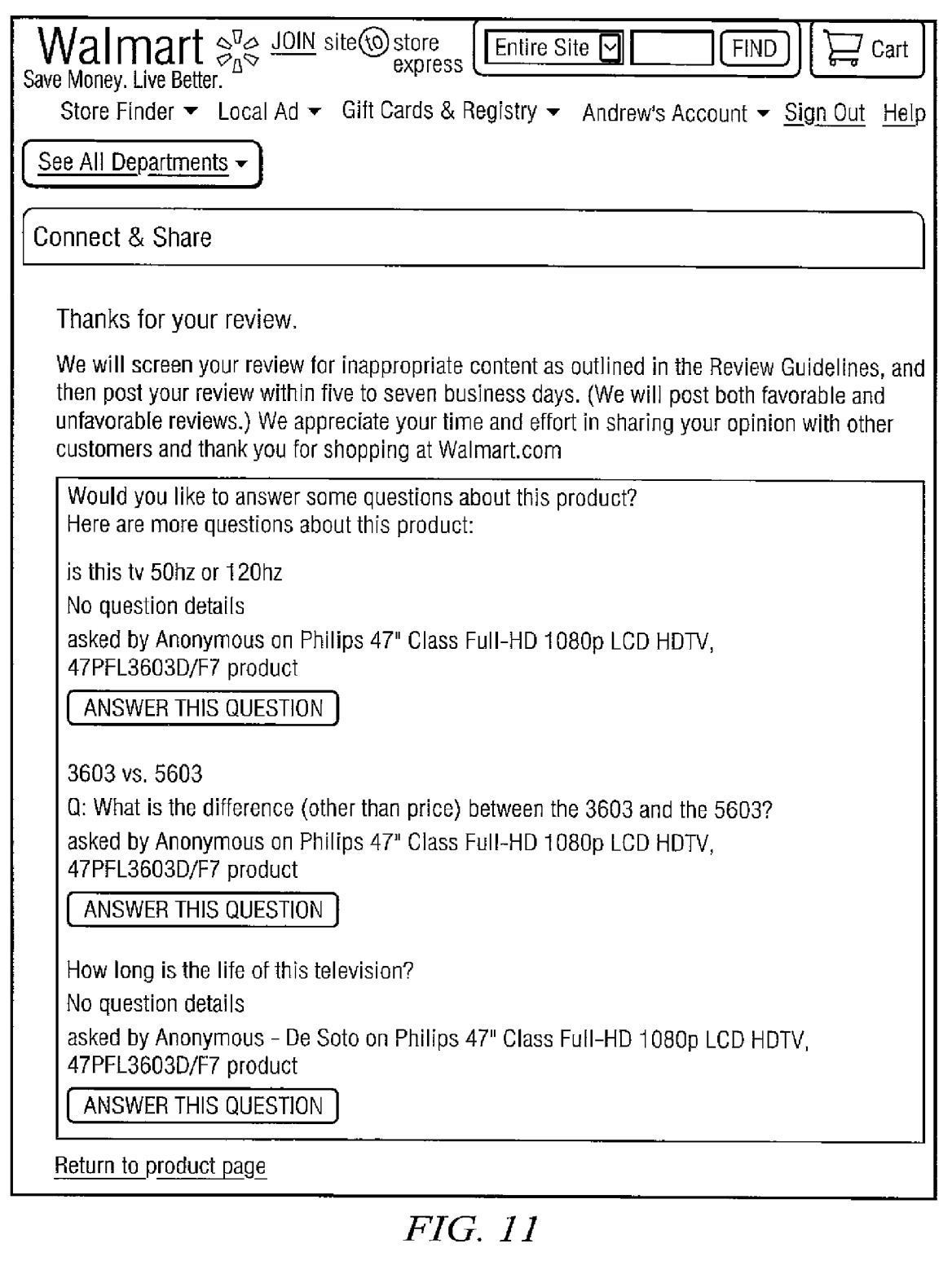

It may be useful to an appreciation of certain embodiments to discuss embodiments of interfaces which may be utilized. FIG. 7 depicts one embodiment of incorporating content 710 in a product page presented to a user, where the product is an Alaskan Cruise package on a cruise line's web site. FIG. 8 depicts one embodiment of a content generation tool being present to a user in conjunction with the presentation of user generated content. To generate content a user may, for example, select the "Answer This Question" button 810. FIG. 9 depicts one embodiment of a content generation tool which may be utilized by a user to generate content, for example after the user selects the "Answer This Question" button 810 in FIG. 8. FIG. 10 depicts one embodiment of a "Thank You" page which may presented to a user after the user's generation of an answer such as depicted in FIG. 9. FIG. 11 depicts one embodiment of a "Thank You" page which may be presented to a user after the user's generation of a review.

In the foregoing specification, the invention has been described with reference to specific embodiments. However, one of ordinary skill in the art appreciates that various modifications and changes can be made without departing from the scope of the invention as set forth. Accordingly, the specification, appendices and figures are to be regarded in an illustrative rather than a restrictive sense, and all such modifications are intended to be included within the scope of invention, notwithstanding the use of any restrictive terms.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for distributing generated content, comprising receiving, at a content distribution system having a processor, first user-generated content from a user, where the first user-generated content was generated at a first web site on a user computer and the first user-generated content is associated with a product or a category;

determining, using the content distribution system, a set of content generation opportunities for the user, where each content generation opportunity is configured to present the user with the opportunity to generate second user-generated content associated with the product or category, each content generation opportunity is determined based on the user and the product or category, and the set of content generation opportunities is determined in real-time based on the generation of the first user-generated content by the user; and simultaneously presenting the set of content generation opportunities to the user at the first web site.

2. The method of claim 1, wherein at least one content generation opportunity comprises at least one question corresponding to the product or category.

3. The method of claim 1, wherein at least one content generation opportunity comprises the opportunity to generate a review for the product.

4. The method of claim 1, wherein at least one content generation opportunity comprises a question or an opportunity to generate a review corresponding to a second product for which the user has previously generated third user-generated content.

5. The method of claim 1, wherein the first user-generated content and the second user-generated content are generated using a content generation tool at the web site.

6. The method of claim 1, wherein the content distribution system hosts the user-generated content.

7. The method of claim 1, wherein incorporating the first user-generated content into a portion of the first web site of a retailer, including displaying the first user-generated content on the site of the retailer in conjunction with the product or category.

8. The method of claim 7, further comprising formatting the user-generated content based upon the site of the retailer.

9. A system for distributing generated content, comprising a first computing device implementing a content distribution system, the first computing device communicatively coupled over a network to a second computing device displaying a first web site, including at least one web page associated with a product or category, the first computing device executing computer instructions for:

receiving, at the content distribution system, first user-generated content from a user, where the first user-generated content was generated at the at least one web page of the first web site and the first user-generated content is associated with the product or the category;

determining a set of content generation opportunities for the user, where each content generation opportunity is configured to present the user with the opportunity to generate second user-generated content associated with the product or category, each content generation opportunity is determined based on the user and the product or category, and the set of content generation opportunities is determined in real-time based on the generation of the first user-generated content by the user; and simultaneously presenting the set of content generation opportunities to the user at the first web site.

10. The system of claim 9, wherein at least one content generation opportunity comprises at least one question corresponding to the product or category.

11. The system of claim 9, wherein at least one content generation opportunity comprises the opportunity to generate a review for the product.

12. The system of claim 9, wherein at least one content generation opportunity comprises a question or an opportunity to generate a review corresponding to a second product for which the user has previously generated third user-generated content.

13. The system of claim 9, wherein the first user-generated content and the second user-generated content are generated using a content generation tool at the web site.

14. The system of claim 9, wherein the content distribution system hosts the user-generated content.

15. The system of claim 9, wherein incorporating the first user-generated content into a portion of the first web site of a retailer, including displaying the first user-generated content on the site of the retailer in conjunction with the product or category.

16. The system of claim 15, further comprising formatting the user-generated content based upon the site of the retailer.

* * * * *